Figure 1:
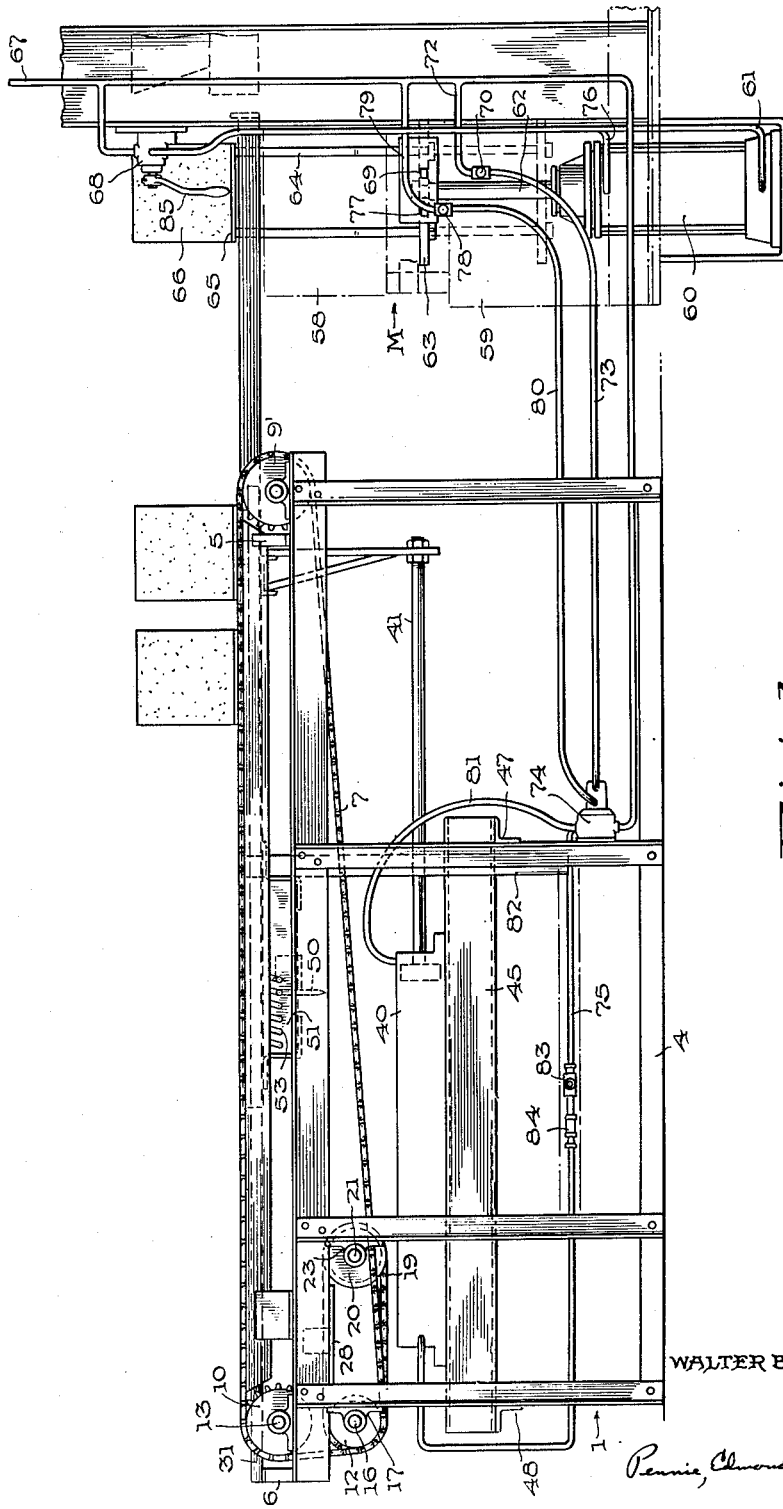

March 25, 1952

W. B. WITTEMANN 2,590,592

ARTICLE TRANSFER MECHANISM

Filed May 14, 1948

4 Sheets-Sheet 1

INVENTOR.
WALTER B. WITTEMANN

ATTORNEYS

March 25, 1952 W. B. WITTEMANN 2,590,592
ARTICLE TRANSFER MECHANISM
Filed May 14, 1948 4 Sheets-Sheet 2

INVENTOR.
WALTER B. WITTEMANN
BY
Pennie, Edmonds, Morton & Barrows
ATTORNEYS

March 25, 1952 W. B. WITTEMANN 2,590,592
ARTICLE TRANSFER MECHANISM
Filed May 14, 1948 4 Sheets-Sheet 3

INVENTOR.
WALTER B. WITTEMANN
BY
Pennie, Edmonds, Morton + Barrows
ATTORNEYS

March 25, 1952 W. B. WITTEMANN 2,590,592
ARTICLE TRANSFER MECHANISM
Filed May 14, 1948 4 Sheets-Sheet 4

INVENTOR.
WALTER B. WITTEMANN
BY
Pennie, Edmonds, Morton & Barrows
ATTORNEYS

Patented Mar. 25, 1952

2,590,592

UNITED STATES PATENT OFFICE 2,590,592

ARTICLE TRANSFER MECHANISM

Walter B. Wittemann, Interlaken, N. J.

Application May 14, 1948, Serial No. 27,067

25 Claims. (Cl. 198—20)

This invention relates to an article transferring or handling apparatus, and more particularly to means for transferring and conveying articles of a more or less fragile nature from a supplying machine to a suitable removal means.

Heretofore, considerable loss has been experienced in production from the high percentages of scrap or breakage inherent in any but the most careful means of handling fragile articles. Conveyors have long been in use for the purpose of transferring articles from one place to another; yet, prior to this time, there has been proposed no entirely satisfactory means for transferring and conveying such articles directly and completely mechanically from a forming or supplying machine to removal means which suitably handles the articles in a manner necessary because of their inherent fragile nature. The procedure in common use ordinarily has consisted of numerous independent steps, usually involving direct manual labor. This causes the fragile articles to be subjected to the danger of rough and non-uniform handling inherent in so many semi-mechanical or manual operations. Such articles cannot be subjected to such handling without the obvious consequences of high losses due to cracking, sagging, breaking or in some way being damaged. Consequently, there is presently a need for a means of transferral more in keeping with the fragile nature of the articles to be handled. It is with such a transfer means that this invention is concerned.

In its broadest aspects, the invention contemplates a transfer mechanism to be used in conjunction with an article forming or supplying machine, which transfer mechanism has attached thereto extensible or projectable members for receiving and removing the articles to be transferred from such article forming or supplying machine. The articles are positively removed by such members and placed by them upon a movable surface of the transfer mechanism which conveys them to a receiving station. The operative portions of both the transfer mechanism and the supplying machine are operated in timed relation so that the transferral and conveyance of the articles are entirely automatic; the controls of the mechanism being so adjusted, timed, and cushioned that the fragile articles are transferred and conveyed with the least possible amount of vibration. Consequently the possibility of breakage or damage of the articles is reduced to a minimum. The advantages of such a device are numerous. In addition to the fact that the careful handling results in an almost negligible amount of broken or damaged articles, the elimination of multiple manual controls and manual labor results in an enormous saving with respect to the cost of production.

The article transfer apparatus of the present invention comprises a suitably mounted chain-driven conveyor having a conveying surface consisting of chains predeterminedly spaced and conveniently supported and, in conjunctive assembly therewith, extensible or projectable members positively operated by driving means mounted beneath the conveying surface and the extensible or projectable members. These members carry a driving pawl or dog which at the proper time in the operative cycle engages a driver chain for the conveyor surface and causes the conveyor surface to travel, step-by-stepwise, a predetermined distance.

The article transfer mechanism is particularly designed for use with an article forming or supplying machine which will bring the articles to be conveyed into position for removal by the extensible or projectable members of the transfer mechanism.

The operations of both machines are so regulated by means of a suitable power system that only one control need be manually manipulated to perform the task of positioning the article to be transferred and transferring it to the conveyor of the transfer mechanism which in turn delivers it to the place where it is removed from the conveyor. Such control when positively operated in one direction causes the positioning mechanism of the supplying-machine to bring the article to the position from which it is to be removed by the extensible or projectable members of the transfer mechanism. During such travel of this positioning means a control member of the synchronized power system is contacted, resulting in the operating means of the transfer mechanism projecting the extensible members and the attached driving pawl outwardly toward the receiving position of the members. The relative positions and the synchronization of the article-transfer mechanism and supplying machine are such that immediately after the completion of the work-stroke of the article-positioning means the extensible members reach the limit of their outstroke being then positioned directly beneath the article to be transferred.

The manually-operated control is then operated in the opposite direction, starting the article-positioning means of the forming or supplying machine on its return stroke leaving the article to be transferred supported by the extended members of the transfer mechanism. During the path of return travel of the article-positioning means another control member is contacted which results in the retraction of the extensible fingers along their inward path of travel carrying thereon the transferred article. As a pawl which is carried by and extends downwardly from the extensible members of the transfer mechanism, approaches the driver chain of the conveyor, a speed control member is automatically operated to reduce the rate at which the members and pawl are being retracted. The pawl, while travelling at this reduced speed, engages the driver chain of the conveyor moving the conveyor surface and the articles, which have been transferred thereto, a predetermined distance governed by the particular adjustment of the pawl, thereby completing one cycle of the operation of the transfer apparatus.

The transfer mechanism will be further described in connection with the accompanying drawings which illustrate an apparatus particularly designed for the transfer of green cement blocks from a standard molding machine to a position from which they may be removed for subsequent curing.

Figure 2:
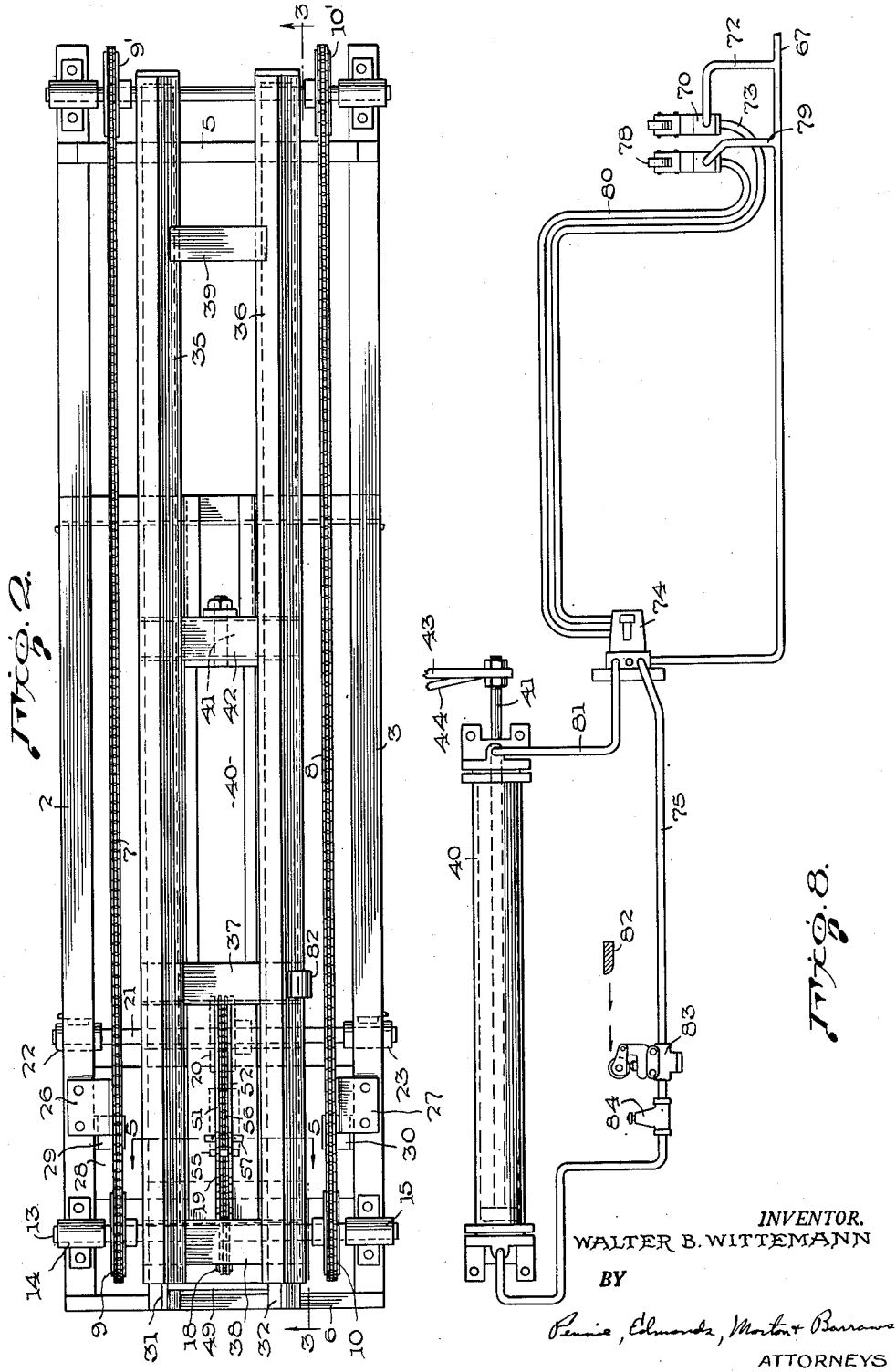
Figure 3:
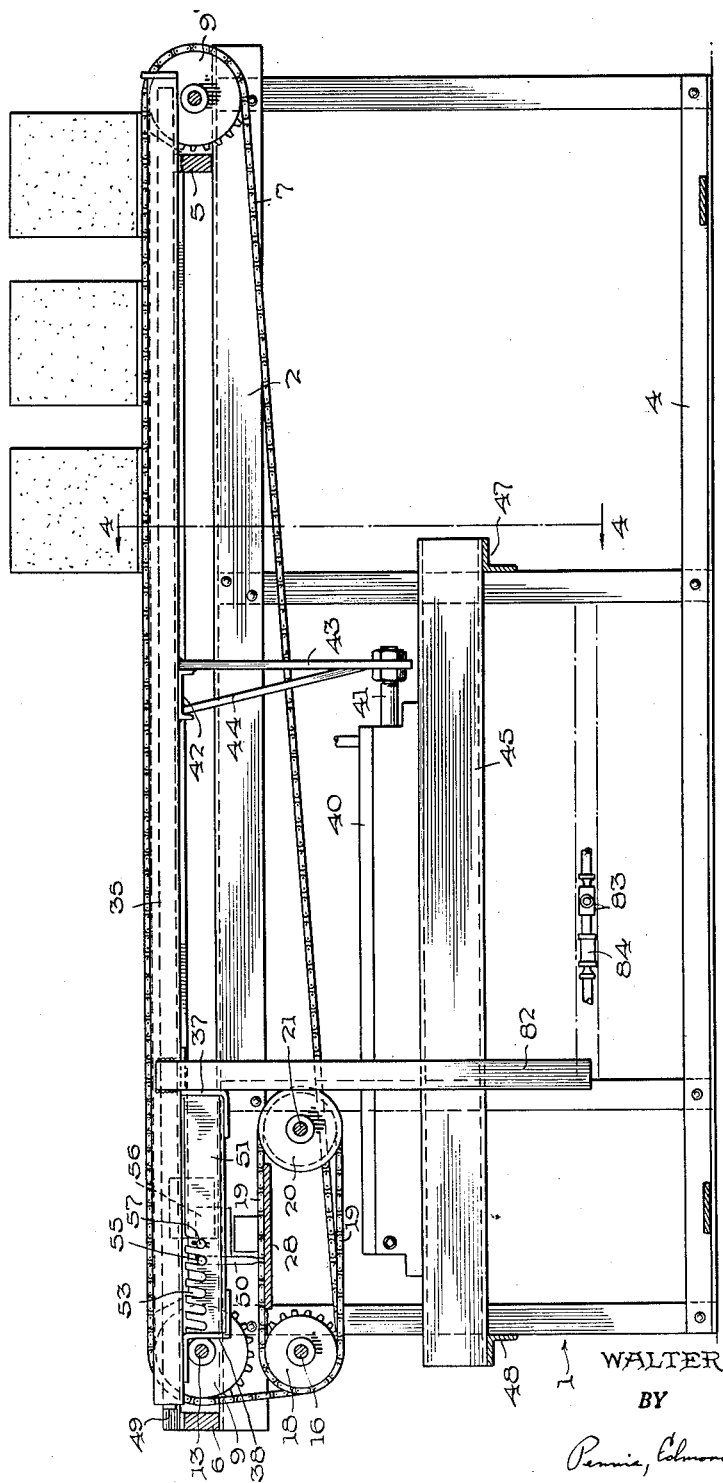
Figure 4:
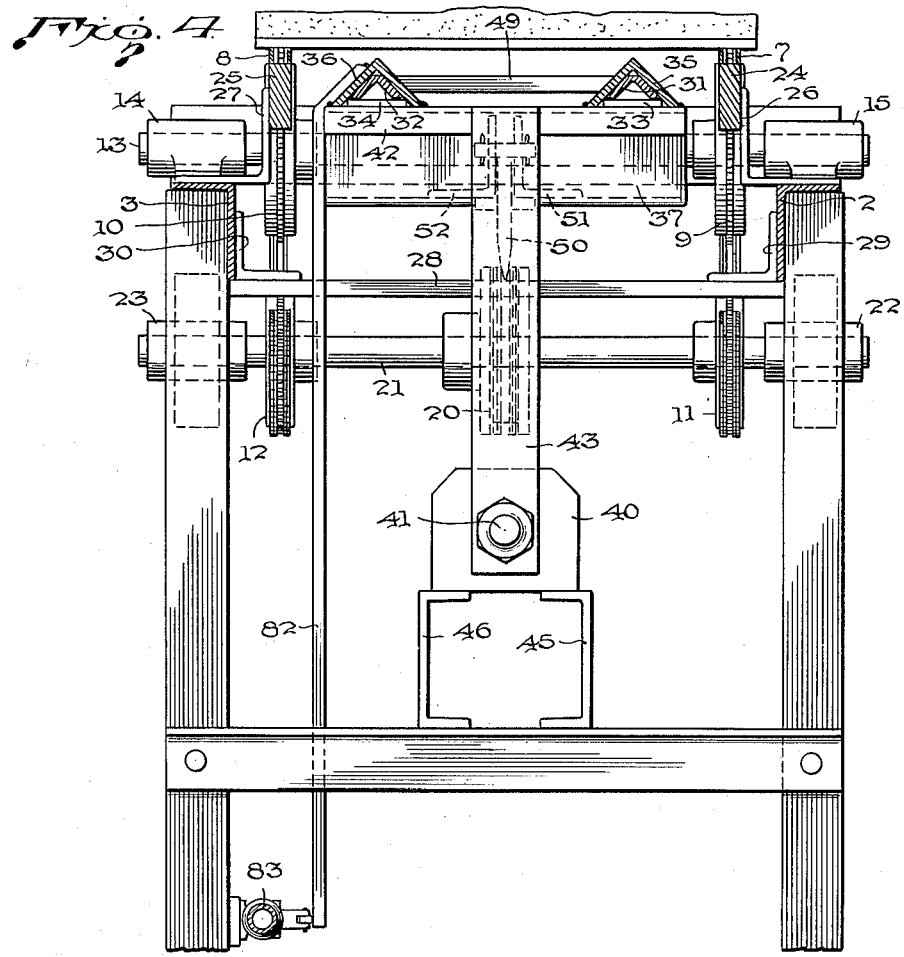
Figures 5, 6, 7:
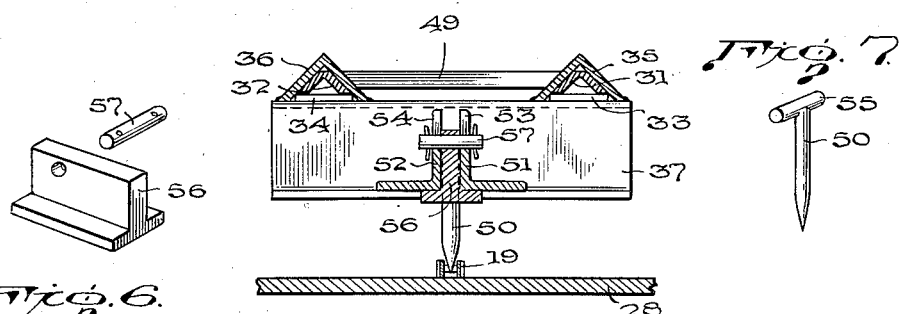

In the drawings,

Fig. 1 is a side elevational view showing the article transfer apparatus and an associated cement block molding machine operatively connected by compressed air lines, Fig. 2 is a plan view of the article transfer apparatus with its extensible article-receiving means at their retracted position, Fig. 3 is a longitudinal sectional view of the article transfer apparatus taken along line 3—3 of Fig. 2, Fig. 4 is a transverse sectional view taken along line 4—4 of Fig. 3, Fig. 5 is a partial sectional view taken along line 5—5 of Fig. 2, Fig. 6 is a perspective view of the pawl stop and its positioning pin, Fig. 7 is a perspective view of the driving pawl of the transfer mechanism, and, Fig. 8 is a schematic view of the power system of the article transfer mechanism and the associated molding machine.

The transfer mechanism comprises a framework 1 formed of upright metal angle bars at each side thereof, the bars at one side being positioned transversely opposite the bars at the other side. At each side, the upper ends of the vertical bars are connected by longitudinally-extending members 2 and 3; similarly, at each side, the lower ends of the vertical bars are connected by longitudinally-extending members 4. Rectangular steel bars 5 and 6 are disposed transversely across and join these two resulting side frame sections and provide connecting means for them as well as means for supporting other parts of the subject apparatus which will become clearer as such parts are met in the description.

Two chain members 7 and 8, one positioned at each side of the framework and extending longitudinally thereof, constitute the conveying means and are supported at the driving or discharge end of the apparatus primarily by sprockets 9 and 10, secondarily, by driving sprockets 11 and 12 and at the opposite or receiving end by sprockets 9' and 10'. The sprockets 9 and 10, in turn, are supported by a shaft 13 mounted in bearings 14 and 15 fixedly attached to the upper longitudinally-extending members of the supporting framework. The driving sprockets 11 and 12 supply the driving power to the conveyor chains and are intermittently operated in a manner hereinafter more fully described. They are located directly below sprockets 9 and 10, respectively, and are supported by a driving shaft 16 which lies in the same vertical plane as, and has its axis parallel to that of, shaft 13. The driving shaft 16 is carried at each end by bearings 17 supported, in any desirable manner, by upright members of the conveyor framework.

As shown in Fig. 2, a sprocket 18 is affixed to the driving shaft midway between the conveying chains and carries the driver chain 19. The driver chain is further supported by sheave 20 mounted upon a shaft 21 midway between its supporting bearings 22 and 23 longitudinally opposite sprocket 18, the bearings 22 and 23 being attached to vertical members of the framework in the same manner as are bearings 17.

Each of the foregoing sprockets is so affixed to its supporting shaft that no relative rotation of sprocket and shaft is possible. Hence, when the driver chain is positively driven the driving force will be transmitted by means of sprocket 18, shaft 16, and driving sprockets 11 and 12 mounted thereon to the conveyor chains which are to carry the articles to be carried. As hereinafter more fully described, the driver chain is intermittently driven and by regulating the distance through which it moves during each of its periods of motion a corresponding intermittent motion is imparted to the conveyor chains which, in turn, move the articles to be transferred by a step-by-step motion along their path of travel toward the discharge end of the mechanism.

The upper flights of the conveyor chains are additionally supported during their path of planar travel by longitudinally disposed members 24 and 25. Such members are supported at the discharge end of the mechanism by angle iron brackets 26 and 27 firmly attached to the longitudinally-extending members 2 and 3 and at the receiving end of the mechanism by transversely-extending member 5. If desirable, any suitable take-up mechanism may be provided to maintain the conveyor chains taut.

A flat rectangular table member 28 is disposed transversely of the framework beneath the upper flight of the driver chain and is supported by angle brackets 29 and 30 secured to the longitudinally-extending members of the supporting framework, such members being so positioned as to support the driver chain and prevent it from sagging.

Spaced guide rails 31 and 32 extend longitudinally of the framework between the conveyor chains and are fixedly secured to and supported at their opposite ends by the transversely-extending connected members 5 and 6, spacing plates 33 and 34 being interposed between the guide rails and the transversely-extending members in order to slightly space the lower edges of the guide rails above the plane of the upper surfaces of the transversely-extending members. Extensibly projectable fingers 35 and 36, conforming in shape to the guide rails, are slidably mounted upon the guide rails of projection longitudinally and outwardly from the receiving end of the transfer mechanism in order to receive the articles to be transferred. As may be seen in Fig. 4, the projectable fingers and the guide rails are of inverted V shape in cross section, the legs of the fingers being sufficiently long to extend slightly below the lower edges of the guide rails.

The extensible fingers are secured together in their properly spaced position and maintained upon the guide rails, at their inner ends, by a pair of connecting Z-shaped plates 37 and 38 which extend transversely of the mechanism beneath the guide rails and to which the lower edges of the legs of the respective fingers are attached. At their forward ends, the projectable fingers are maintained in their properly spaced positions, with respect to one another and to the guide rails, by a connecting plate 39 attached to the edges of the inner legs of the respective fingers. As the Z-shaped plates, which are affixed to the fingers, extend beneath the guide rails they prevent the inner ends of the fingers from being lifted off the guide rails by the weight of an article placed upon the fingers when they are in an extended or projected position.

Movement is imparted to the extensible fingers, through a suitable connecting means, by a longitudinally disposed compressed air cylinder 40 having a thrust piston rod 41. The connecting means comprises a channel iron 42 transversely secured to the under side of the extensible fingers, a vertically disposed flat rectangular member 43 securely fixed to the channel iron and extending downwardly therefrom, and an inclined bracing member 44 extending from the lower portion of the vertical member to the inner edge of the channel iron. The vertical member is connected to the thrust piston rod of the compressed air cylinder by two nuts threaded onto the piston rod at opposite sides of the vertical member. The compressed air cylinder is itself supported, longitudinally and centrally of the mechanism, by two longitudinally-extending channel members 45 and 46 mounted on angle members 47 and 48 which are transversely disposed in a horizontal plane and are affixed in any desirable manner to vertically upright frame members. Thus, when desired, compressed air may be supplied to the rear end of the working space of the compressed air cylinder so that the thrust piston rod is forced forwardly and outwardly therefrom imparting, through the described connecting means, an outward projection to the extensible fingers and also, when desired, by supplying compressed air to the opposite or forward end of the compressed air cylinder the thrust piston rod may be forced inwardly causing the extensible fingers to be retracted. As a safeguard against too great retraction of the fingers a backstop member 49 is secured at the driving end of the mechanism upon the guide rails for the fingers so that the fingers will abut it when they have been retracted to a predetermined extent. The length of the extensible fingers is such that the forward or receiving end of each, in the retracted position, is substantially adjacent the point at which the conveying chains leave the supporting sprockets at the receiving end of the mechanism. Thus, when the extensible fingers have been projected outwardly and have received an article to be transferred, and then retracted, the article will be transferred completely to the conveyor chains by the time the fingers have completed the retraction stroke.

Means for imparting a driving force to the driver chains is carried by the extensible fingers and is positioned below and midway between their inner ends. As best shown in Figs. 3 and 5, this means comprises a pawl 50 carried by two angle irons 51 and 52 longitudinally disposed centrally below the fingers and supported by the Z-shaped plates 37 and 38, each angle iron having one leg extending vertically upwardly and the other leg horizontally and outwardly. A series of slots 53 and 54 extend downwardly into the vertical arms of the longitudinally disposed angle irons, each slot in one angle iron being transversely opposite a corresponding slot in the other.

As shown in Fig. 7, the pawl 50 is T-shaped and is adapted to be adjustably positioned longitudinally of the longitudinally-disposed angle irons and to have its cross head 55, preferably circular in cross section, received in any pair of opposite slots. The shank of the pawl, which is positioned directly over the driver chain, is of such length that when the pawl is resting in a pair of transverse slots, the cross head being at the bottom thereof, the lower end or tip of the shank, which preferably is pointed, will properly fit into a link of the driver chain sufficiently to be able to impart a driving force thereto. As the pawl and its supporting means are fastened only to the extensible fingers, it is clear that it will necessarily be carried along with the fingers when they are moved.

A pawl stop 56 as well as a fastening pin 57 therefor is shown in Figs. 5 and 6 as being in the form of an inverted T. This stop is adapted to have its vertical portion fit between the longitudinally-extending pawl supporting angle irons 51 and 52 and to be secured therebetween by means of the pin 57 which is passed through a hole therein as well as through a pair of opposite slots in the longitudinal members when the vertical portion of the stop has been so adjusted that the hole therein lies between said pair of slots. The function of the stop is to constrain the shank of the pawl to a vertical position during its operative travel and thus the stop is positioned as shown best in Fig. 3 so that its securing pin lies in the pair of slots immediately next to the pair containing the pawl on the outward side thereof. When the extensible fingers are being retracted, the tip of the pawl shank engages within one of the links of the driver chain and, because it is constrained to a vertical position by the pawl stop, drives this chain a distance equal to that travelled by the pawl between the time of its engagement with the chain and the time at which it reaches the end of its inward travel. As has been explained, when movement is imparted to the driver chain a comparable movement is also imparted to the conveyor chains so that by adjusting the pawl longitudinally in its carrier members, the conveyor chains may be driven, stepwise, a predetermined distance, usually a distance just sufficient to move the articles which have been previously placed thereon a distance required to allow the placement of an additional article thereon.

After the extensible fingers have reached the limit of their retraction stroke they are again projected to receive another article. And, thus, the pawl is carried outwardly again. In order that the conveyor chains will not be driven in the reverse direction, the pawl must necessarily disengage the driver chain on this projection stroke. This is permitted due to the fact that the pawl is freely swingable in the slots of its carrier members, except when abutted by the pawl stop. As there is nothing on the inward side of the pawl to prevent it from swinging inwardly, it will thus do so when its supporting members are carried outwardly by the projectable fingers, its tip thereby riding out of the link in which it has been resting in the driver chain so that it imparts no driving force to the driver chain.

As shown in Fig. 1, a standard cement block molding machine M, which in itself forms no part of the invention, is used in conjunction with the transfer apparatus and comprises a molding box 58, a supporting framework 59, a fluid pressure operated stroke cylinder 60 and a conduit 61 for transmitting compressed air to the stroke cylinder to cause its operation. The thrust piston rod 62 of the stroke cylinder 60 is attached in any desirable manner to lift plate 63 which, in turn, is suitably connected to the lift rods 64 adapted to lift a pallet 65 and a cement block 66 supported thereon from the molding position to the position at which such pallet and block are to be received by the fingers 35 and 36 of the transfer mechanism. The molding machine is so positioned with respect to the transfer mechanism, and the lift fingers are sufficiently close together that when the two machines are in synchronous operation, the projectable fingers 35 and 36 of the transfer mechanism will pass outside of the lift rods 64 of the molding machine.

As best disclosed in Figs. 1 and 8 of the drawings, the transfer mechanism and the molding machine are connected only by the several fluid pressure lines required for the operation of the two machines in timed relation with one another. The fluid power transmitting means includes a main air pressure line 67, shunt lines and a series of cam pilot operating valves. The cam pilot operating valves are of standard design and are such that they may be operated by an actuating member when said actuating member moves past and contacts them in one direction but permit the return of the actuating member to its initial position without further operation of the valves. The main valve 68 of the molding machine, upon operation, permits compressed air to pass from the main line 67 through line 61 to the lower end of the compressed air cylinder 60 of the molding machine to impart to the piston thereof a force by which it raises a molded block from the molding position to the transfer position. An arm 69 extending laterally from the lift plate 63 of the molding machine, which is affixed to the thrust piston rod of said molding machine contacts cam pilot operating valve 70 on its upward stroke thus allowing air pressure to pass therethrough from the mail line 67, by means of lines 72 and 73, to the four-way remote control valve 74. This supplying of air pressure to the four-way remote control valve causes such valve to allow air to pass from the main line therethrough and by means of line 75 to the inner end of the chamber of the compressed air cylinder 40. As a result the extensible fingers 35 and 36 of the transfer mechanism are started on their outward stroke. By operation of valve 68 in the opposite direction, compressed air is supplied to the upper end of the compressed air cylinder 60 of the molding machine through line 76 and causes the piston rod of said molding machine to be drawn downwardly or retracted. During this downward stroke, a second laterally-extending arm 77, carried by the lift plate 63, actuates cam pilot operating valve 78 which, similarly to cam pilot operating valve 70, allows air to pass from the main line to the four-way remote control valve 74 through shunt lines 79 and 80. This causes said remote control valve 74 to allow passage of air therethrough from the main line to the outer end of the chamber of the compressed air cylinder 40 of the transfer mechanism, by means of line 81, resulting in the retraction of piston rod 41 and the corresponding retraction of the extensible fingers 35 and 36 of the transfer mechanism.

As the extensible fingers approach the inner end of their path of travel, an arm 82 which extends downwardly from extensible finger 36 and which is carried along thereby during its movement contacts cam pilot operating valve 83 which, in turn, cooperates with a conventional speed control valve 84 to maintain sufficient air within the rear end of the cylinder of the transfer mechanism to cause the speed with which the fingers are retracted to decrease as the pawl approaches the driver chain 19.

To form a cement block, a pallet 65 is placed in the molding box 58 of the molding machine and the cement mix is disposed thereon and suitably packed by a ramming means (not shown). After the block has been molded, the valve lever 85 of the valve 68 is operated so as to permit compressed air from the supply line to flow to the lower end of the power cylinder 60 of the molding machine which causes the piston therein to be forced upwardly carrying with it the lift plate 63 and the lift rods 64. As the lift rods move upwardly, they engage the lower surface of the pallet which supports the cement block and eject the pallet and cement block from the molding box and raise them to their position for transfer to the extensible fingers of the transfer mechanism. As shown in Fig. 1, at an appropriate point in the upward travel of the lift plate, the arm 69 extending laterally therefrom contacts the cam pilot operating valve 70 to permit air pressure to flow from the main supply line to the rear end of the cylinder 40. The air pressure supplied to the rear end of the cylinder 40 forcibly projects the piston rod 41 outwardly and through its connecting means with the extensible fingers, causes them to be projected outwardly. The timing of these operations, that is, the upward movement of the molding machine piston rod and the outward projection of the transfer mechanism fingers is such that immediately after the pallet and the supported cement block have reached the extremities of their upward travel, the transfer mechanism fingers will have arrived at the extremities of their outward travel, the ends thereof then being in a position below said block and pallet.

The valve lever 85 is next manually operated so as to permit compressed air to flow from the main supply line 67 to the upper end of the power cylinder 60 of the molding machine, causing the piston thereof and the lift rods to be retracted downwardly, thereby leaving the pallet and supported cement block resting upon the extensible fingers 35 and 36 of the transfer mechanism. The laterally extended arm 77 of the lift plate comes into contact with cam pilot operating valve 78, at an appropriate point in its downward path of travel, causing air pressure from the main supply line to be admitted by means of the four-way remote control valve 74 to the outer end of the stroke cylinder 40 of the transfer mechanism. This results in the thrust piston rod 41 and the extensible fingers connected thereto being retracted, the fingers carrying thereon the pallet and supported cement block.

At that point in the retraction of the extensible fingers of the transfer mechanism at which the pawl approaches the driver chain, the downwardly extending arm 82 contacts the cam pilot operating valve 83 which cooperates with the conventional speed control valve 84 to maintain sufficient air within the rear end of the cylinder to cause the speed with which the fingers are retracted to be reduced, thus allowing a smooth engagement of the pawl 50 with the driver chain 19.

The continuing inward movement of the pawl after it engages the driver chain causes the chain to travel a predetermined distance, depending upon the particular setting of the pawl in its supporting members as hereinbefore explained. This movement of the driver chain, through shaft 16 and sprockets 11 and 12, imparts a corresponding movement to the conveyor chains in order that the cement blocks previously deposited thereon will be carried toward the discharge end of the transfer mechanism a distance sufficient to allow the block supported on the fingers to be transferred thereto.

The transfer of such pallet and block from the projectable fingers to the conveyor chains takes place as the fingers approach the inward limit of their travel, which is partially determined by the position of the backstop member 49. Just prior to this position, the edge of the pallet which is closest the conveyor chains is met by the upwardly moving chains as they feed off the sprockets 9' and 10' and, thus, momentarily, the pallet is supported both by the chains and the projectable fingers. However, as the fingers continue their inward movement, the pallet and block carried thereby become entirely supported by the chains, one full cycle of the synchronous operation of the machines being completed.

When the articles placed upon the article conveying means of the transfer mechanism have progressed to the discharge end thereof by a step-by-step movement, resulting from a number of such operating cycles, they may be removed therefrom in any suitable manner.

It should be clearly understood that, while air pressure has been referred to as the power fluid for imparting the driving force to the driving means in the example of the transfer mechanism as herein set forth, any other means for the operation thereof may be used instead, for example, other fluid pressure means; likewise, the operation of the transfer mechanism and the molding machine, in timed relation, may be accomplished by suitable mechanical means. It should also be understood that various changes may be made in the details of the apparatus without departing from the invention or sacrificing the advantages thereof.

I claim:

1. An article transfer mechanism comprising a conveyor having a horizontally-extending transfer portion, means for driving said conveyor, at least one projectable and retractable member for transferring articles to said conveyor, means for operating said projectable and retractable member to project the same horizontally to a position in which a portion thereof extends horizontally beyond the horizontally-extending transfer portion of the conveyor to receive articles to be transferred to the conveyor, means for horizontally-retracting the projectable and retractable member to a position where articles on the projected portion thereof are transferred to the conveyor, and means set into operation by the projectable and retractable member for causing the driving means to be operated in timed relation with the reciprocation of said projectable and retractable member.

2. An article transfer mechanism as defined in claim 1 in which there is a plurality of spaced, substantially parallel projectable and retractable members for transferring articles to said conveyor.

3. An article transfer mechanism as defined in claim 2 in which the means for projecting and retracting the projectable and retractable member includes a fluid-pressure-operated stroke cylinder, a thrust piston rod reciprocably mounted therein, a bridging member connecting said projectable and retractable members, and a member attached to said bridging member and so connected to the thrust piston rod that reciprocation of the thrust piston rod in said stroke cylinder causes corresponding reciprocation of the projectable and retractable members.

4. An article transfer mechanism as defined in claim 1 which includes means for limiting the retraction stroke of said projectable and retractable member.

5. An article transfer mechanism as defined in claim 1 in which the conveyor is driven intermittently.

6. An article transfer mechanism as defined in claim 4 in which the means for projecting and retracting the projectable and retractable member includes a fluid-pressure-operated stroke cylinder, a thrust piston rod reciprocably mounted therein, and means so connecting said thrust piston rod and said projectable and retractable member that reciprocation of said thrust piston rod in said stroke cylinder causes corresponding reciprocation of the projectable and retractable member.

7. An article transfer mechanism as defined in claim 1 in which the conveyor comprises spaced endless chains and which includes a horizontally-extending member for supporting and guiding the projectable and retractable member during its projection and retraction, said supporting and guiding member being disposed substantially parallel to the effective article-conveying portions of said chains.

8. An article transfer mechanism comprising a conveyor, at least one projectable and retractable member for transferring articles to said conveyor, means for projecting and retracting said member, a driver chain, a pawl-supporting means carried by said projectable and retractable member, a pawl supported by said pawl-supporting means and engageable with said driver chain to impart a driving force thereto in timed relation with the operation of said projectable and retractable member, means for reducing the rate of travel of the projectable and retractable member during its retraction stroke prior to the engagement of the pawl with the driver chain, and means operatively connecting the driver chain with the conveyor, whereby a driving force imparted to the driver chain by the pawl is transmitted to the conveyor.

9. An article transfer mechanism comprising a conveyor, at least one projectable and retractable member for transferring articles to said conveyor, means for projecting and retracting said member, a driver chain, a pawl-supporting means carried by said projectable and retractable member including spaced, substantially parallel members disposed longitudinally of the conveyor and provided with a series of slots to receive and support the cross head of a pawl, a generally T-shaped pawl having the cross head thereof received in a pair of said slots and the shank thereof extending between said parallel members and engageable with said driver chain to impart a driving force thereto in timed relation with the operation of said projectable and retractable member, and means operatively connecting the driver chain with the conveyor, whereby a driving force imparted to the driver chain by the pawl is transmitted to the conveyor.

10. An article transfer mechanism comprising a conveyor, at least one projectable and retractable member for transferring articles to said conveyor, means for projecting or retracting said member, a driver chain, a pawl-supporting means carried by said projectable and retractable member including spaced, substantially parallel members disposed longitudinally of the conveyor to form a support for the cross head of a pawl, a generally T-shaped pawl having the cross head thereof supported by said parallel members and the shank thereof extending between said parallel members and engageable with said driver chain to impart a driving force thereto in timed relation with the operation of said projectable and retractable member, means for maintaining the pawl shank in engagement with the driver chain during a portion of the retraction stroke of the projectable and retractable member, and means operatively connecting the driver chain with the conveyor, whereby a driving force imparted to the driver chain by the pawl is transmitted to the conveyor.

11. An article transfer mechanism as defined in claim 10 in which the means for maintaining the pawl shank in engagement with the driver chain comprises a member of general T-shape so positioned that the shank thereof extends between the spaced, substantially parallel members and lies adjacent, and acts as a stop for, the shank of the pawl, and means for maintaining said member in such a position.

12. An article transfer mechanism comprising spaced endless chains, portions of said chains extending horizontally to provide article-conveying means, means for driving said chains, a plurality of spaced, horizontally-extending, substantially parallel projectable and retractable members overlapping the endless chains for transferring articles to the conveying portions of said chains, means for projecting the projectable and retractable members horizontally to a position in which portions thereof extend horizontally beyond the horizontally-extending portion of the conveyor chains to receive articles to be transferred to the conveying portions of said chains, means for horizontally retracting the projectable and retractable members to a position where articles on the projected portion thereof are transferred to the conveying portions of said chains, horizontally-extending means for supporting and guiding the projectable and retractable members during their reciprocation, said supporting and guiding members being disposed substantially parallel to the article-conveying portions of said chains, and means operated by said projectable and retractable members for actuating the driving means for said chains, whereby the movement of the conveyor chains is controlled by the operation of the projectable and retractable transfer means.

13. An article transfer mechanism comprising a conveyor, at least one projectable and retractable member for transferring articles to said conveyor, means for projecting and retracting said member, a driver chain, a pawl-supporting means carried by said projectable and retractable member, a pawl supported by said pawl-supporting means and engageable with said driver chain to impart a driving force thereto, and means operatively connecting the driver chain with the conveyor whereby a driving force imparted to the driver chain by the pawl is transmitted to the conveyor.

14. An article transfer mechanism as defined in claim 13 in which the pawl is so supported by said supporting means as to be adjustable longitudinally of the path of travel of that portion of the driver chain with which the pawl is engageable.

15. An article transfer mechanism as defined in claim 13 in which the pawl is of general T-shape, in which the pawl-supporting means comprises spaced, substantially parallel members disposed longitudinally of the conveyor to form a support for the head of the pawl, and in which the shank of the pawl extends between said spaced, substantially parallel members.

16. Apparatus for transferring articles comprising article-positioning means, fluid-pressure-actuating means for operating said article-positioning means, a source of fluid under pressure, means for supplying fluid from said source to said operating means, a valve for controlling the supply of fluid to said operating means, a conveyor, a fluid-pressure-operated stroke cylinder, a piston reciprocably mounted in said cylinder, a thrust piston rod connected to said piston, at least one projectable and retractable member for transferring articles from the article-positioning means to said conveyor, means operatively connecting said projectable and retractable member to the thrust piston rod, means for supplying fluid under pressure from said source to the stroke cylinder, valve means for controlling the supply of fluid from said source to the stroke cylinder, and means operatively connected with the article-positioning means for actuating said valve means to cause the projectable and retractable member to be projected and retracted in timed relation with said article-positioning means.

17. Apparatus for transferring articles as defined in claim 16 which includes a speed-control valve for controlling the flow of fluid to the stroke cylinder, means for actuating said speed-control valve, and means operated in timed relation with the projectable and retractable member for actuating the last-mentioned means to cause the speed of retraction of said projectable and retractable member to be reduced during a portion of its retraction stroke.

18. Apparatus for transferring articles as defined in claim 17 in which the speed-control valve is actuated at such time that the speed of retraction of the projectable and retractable member is caused to be reduced as said projectable and retractable member approaches the end of its retraction stroke.

19. Apparatus for transferring articles as defined in claim 16 which includes a speed-control valve for controlling the flow of fluid to the stroke cylinder, means for actuating said speed-control valve, and means operatively connected to the projectable and retractable member for actuating the last-mentioned means to cause the speed of retraction of said projectable and retractable member to be reduced as it approaches the end of its retraction stroke.

20. Apparatus for transferring articles as defined in claim 16 which includes means for driving said conveyor and means operatively connected to the projectable and retractable member for actuating said conveyor driving means, whereby the conveyor-driving means is operated in timed relation with the projectable and retractable member and with the article-positioning means.

21. Apparatus for transferring articles as defined in claim 20 which includes a speed-control valve for controlling the flow of fluid to the stroke cylinder, means for actuating said speed-control valve and means operated in timed relation with the projectable and retractable member for actuating the last-mentioned means to cause the speed of retraction of said projectable and retractable member to be reduced as the means for operating the driving means for the conveyor approaches said driving means.

22. Apparatus for transferring articles comprising article-positioning means, fluid-pressure-actuated means for operating said article-positioning means, a source of fluid under pressure, means for supplying fluid from said source to said operating means, a valve for controlling the supply of fluid to said operating means, a conveyor, a fluid-pressure-operated stroke cylinder, a piston reciprocably mounted in said cylinder, a thrust piston rod connected to said cylinder, at least one projectable and retractable member for transferring articles from the article-positioning means to said conveyor, means operatively connecting said projectable and retractable member to the thrust piston rod, two conduits for supplying fluid under pressure from said source to said stroke cylinder, one for supplying fluid to one end thereof and the other for supplying fluid to the other end thereof, a valve for controlling the supply of fluid through each of said conduits, means operatively connected with the article-positioning means for actuating one of said last-mentioned valves to cause the projectable and retractable member to be projected to a position to receive an article from the article-positioning means in timed relation with the operation of said article-positioning means, and means operatively connected with the article-positioning means for actuating the other of said last-mentioned valves to cause the retraction of said projectable and retractable member in timed relation with the article-positioning means.

23. Apparatus for transferring articles as defined in claim 22 which includes a speed-control valve operatively connected to the conduit for carrying fluid to the end of the cylinder to cause the projectable and retractable member to be projected, means for actuating said speed-control valve, and means connected to the projectable and retractable member for actuating the last-mentioned means to cause the speed of retraction of said projectable and retractable member to be reduced as it approaches the end of its retraction stroke.

24. Apparatus for transferring articles comprising means for raising an article to be transferred to a position for transfer, said means returning subsequently to its original position, fluid-pressure-actuated means for operating said article-raising means, a source of fluid under pressure, a conduit for supplying fluid from said source to said operating means, a valve for controlling the flow of fluid through said conduit, a conveyor, a fluid-pressure-operated stroke cylinder, a piston reciprocably mounted in said cylinder, a thrust piston rod connected to said piston, at least one projectable and retractable member for transferring articles from the article-raising means to said conveyor, means operatively connecting said projectable and retractable member to the thrust piston rod, means for supplying fluid from said source to the stroke cylinder, valve means for controlling the flow of fluid from said source to the stroke cylinder, and means operatively connected with the article-raising means for actuating said valve means so that the projectable and retractable member is projected to receive the article to be transferred from the article-raising means and reaches the end of its projection stroke after the article has reached the transfer position and so that said projectable and retractable member is started on its retraction stroke during the return of the article-raising means to its original position.

25. Apparatus for transferring articles as defined in claim 24 in which the article-raising means includes means for supporting an article over a vertically-free space and in which the article-raising means is so positioned with respect to the projectable and retractable member that when said member is in its fully projected position the article-receiving portion thereof lies within said vertically-free space and beneath an article carried by the article-raising means, whereby, when the article-raising means returns to its original position, the article is left resting upon the projectable and retractable member.

WALTER B. WITTEMANN.

REFERENCES CITED

The following references are of record in the file of this patent:

UNITED STATES PATENTS

| Number | Name | Date |
|---|---|---|
| 1,718,443 | Straight | June 25, 1929 |
| 1,858,619 | Delamere | May 17, 1932 |